(12) United States Patent
Klaassen

(10) Patent No.: US 10,259,011 B2
(45) Date of Patent: Apr. 16, 2019

(54) DISC FOR A SEPARATING CONVEYOR SCREEN AND SEPARATING CONVEYOR SCREEN INCLUDING SUCH A DISC

(71) Applicant: BOLLEGRAAF PATENTS AND BRANDS B.V., Appingedam (NL)

(72) Inventor: Gerrit Johan Klaassen, Coevorden (NL)

(73) Assignee: BOLLEGRAAF PATENTS AND BRANDS B.V., Appingedam (NL)

( * ) Notice: Subject to any disclaimer, the term of this patent is extended or adjusted under 35 U.S.C. 154(b) by 0 days.

(21) Appl. No.: 15/634,424

(22) Filed: Jun. 27, 2017

(65) Prior Publication Data
US 2017/0368576 A1 Dec. 28, 2017

(30) Foreign Application Priority Data
Jun. 27, 2016 (EP) .................................... 16176374

(51) Int. Cl.
*B07B 1/15* (2006.01)
*F16D 1/08* (2006.01)

(52) U.S. Cl.
CPC ................ *B07B 1/155* (2013.01); *B07B 1/15* (2013.01); *F16D 1/0876* (2013.01)

(58) Field of Classification Search
CPC .................................. B07B 1/15; B07B 1/155
USPC ................................................. 209/671, 672
See application file for complete search history.

(56) References Cited

U.S. PATENT DOCUMENTS

| | | | | |
|---|---|---|---|---|
| 1,418,899 | A * | 6/1922 | Acken ....................... | B07B 1/15 209/671 |
| 3,306,441 | A * | 2/1967 | Sanders .................... | B02C 4/00 209/233 |
| 4,380,405 | A | 4/1983 | Kaneki et al. | |
| 4,795,036 | A * | 1/1989 | Williams .................. | B07B 1/15 209/667 |
| 6,076,684 | A | 6/2000 | Bollegraaf | |
| 6,318,560 | B2 * | 11/2001 | Davis ........................ | B07B 1/15 209/667 |
| 7,661,537 | B1 * | 2/2010 | Sewell ...................... | B07B 1/15 209/668 |
| 8,424,684 | B2 | 4/2013 | Campbell et al. | |
| 8,800,781 | B1 * | 8/2014 | Carlile, Jr. .............. | B07B 1/155 209/671 |
| 9,027,762 | B2 * | 5/2015 | Davis ........................ | B07B 1/16 209/672 |

(Continued)

FOREIGN PATENT DOCUMENTS

| | | |
|---|---|---|
| EP | 0773070 A1 | 5/1997 |
| EP | 2322288 A2 | 5/2011 |
| GB | 191225620 A | 3/1913 |

*Primary Examiner* — Joseph C Rodriguez
(74) *Attorney, Agent, or Firm* — Pearne & Gordon LLP

(57) ABSTRACT

A disc for a separating conveyor screen has a disc body with an opening in an axial direction for receiving a shaft. At least one anchoring member of the disc has an anchoring portion projecting into the opening in a radially inward direction and has a positioning portion fitted in a disc body of the disc. The anchoring portion has at least one projection in circumferential sense of the opening for anchoring in at least one recess in an outside surface of the shaft. At least one tensioner is provided for tensioning the anchoring member and the disc body radially towards each other. A separating conveyor screen equipped with such discs is also described.

14 Claims, 7 Drawing Sheets

(56) References Cited

U.S. PATENT DOCUMENTS

| | | | | |
|---|---|---|---|---|
| 9,056,334 B2* | 6/2015 | Davis | ................ | B07B 1/155 |
| 9,238,254 B1* | 1/2016 | Davis | ................ | B07B 1/15 |
| 9,387,516 B1* | 7/2016 | Davis | ................ | F16C 13/00 |
| 9,636,711 B2* | 5/2017 | Benjamins | ............ | B07B 1/15 |
| 2010/0264069 A1* | 10/2010 | Green | ................ | B07B 1/15 |
| | | | | 209/262 |
| 2011/0049022 A1 | 3/2011 | Davis | | |
| 2011/0108467 A1 | 5/2011 | Campbell et al. | | |
| 2013/0341256 A1 | 12/2013 | Davis | | |

\* cited by examiner

DISC FOR A SEPARATING CONVEYOR SCREEN AND SEPARATING CONVEYOR SCREEN INCLUDING SUCH A DISC

FIELD AND BACKGROUND OF THE INVENTION

The invention relates to a disc for a separating conveyor screen and to a separating conveyor screen.

Separating conveyor screens or sorting conveyor screens are used for separating materials composed of large numbers of particles or items into fractions with different distributions of a property. The item property on which separation is based may for instance be size of the particles or items, such as in separating mud from potatoes, separating larger stones from smaller stones, sand and clay or separating larger fruit from smaller fruit. The separation may also be based on other properties, such as separating on the basis of stiffness of the items, such as in separating waste paper from waste cardboard to avoid inclusion of substantial amounts of waste cardboard in raw material from which paper is to be made, which would result in relatively grey or brown paper.

In such a separating conveyor, a screen is formed by a row of rotatable, driven shaft assemblies mutually spaced in a conveying direction and each extending transversely to the conveying direction. The shafts of each of the shaft assemblies each carry a row of radially extending discs for intermittently urging material on the separating conveyor screen upward and in the conveying direction. The discs of each of the rows are mutually spaced in longitudinal direction of the respective shaft. In particular for sorting on the basis of deformability or for removing adhering material from larger items, rotary contours of discs carried by each of the shafts may project between rotary contours of the discs carried by a neighboring one of the shafts. In particular for accurate separation by size of generally ball, cube or similarly shaped items with no predominant length and/or width, discs of successive shafts may be positioned mutually in-line in transport direction, leaving open passages for material to fall through that precisely match the maximum dimensions of items that are to fall through the passages.

In operation, a material to be separated is fed to the upstream end of the separating conveyor. Rotary motion of the discs intermittently urges the material on the conveyor upward and forward in conveying direction. Thus, the material on the conveyor is simultaneously shaken and transported along the conveyor. The smaller and/or more easily deformable parts of the material tend to fall through openings between the shafts and the discs. Since for instance paper in a mixture of paper and cardboard is typically of a smaller size and more flexible than cardboard, paper on the conveyor tends to fall through interspaces between the shafts and the discs, while cardboard tends to remain on top of the conveyor. Thus, a first separated material predominantly consisting of cardboard can be collected at the downstream end of the conveyor or succession of conveyors, and a second separated material predominantly consisting of paper can be collected from under the conveyor.

A disc and a separating conveyor screen of the initially-identified type for sorting waste paper from waste cardboard are described in applicant's European patent 0 773 070. In this separating conveyor screen, the mutual spacing between the discs of at least one of the rows in longitudinal direction of the respective shaft is easily adjustable, because the discs are releasably clamped onto the shafts.

SUMMARY OF THE INVENTION

It is an object of the present invention to allow the positions of the discs to be fixed and released more quickly and to allow the discs to be fixed more reliably.

According to the invention, this object is achieved by providing a disc for a separating conveyor screen, which disc has a disc body, at least one anchoring member and at least one tensioner. The disc body has a releasable part and an opening in an axial direction for receiving a shaft carrying the disc. The releasable part is displaceable when in released condition between a displaced position leaving open a radial passage for passing the shaft radially into and out of the opening and a mounted position for enclosing the shaft in the opening. The at least one anchoring member is arranged for fixation in a recess in an outside surface of the shaft. The at least one tensioner is for tensioning the disc body and the anchoring member radially towards each other.

The invention can also be embodied in a separating conveyor screen for sorting a material composed of large numbers of loose items or particles, into a first fraction having a first distribution of a property of the particles or items and a second fraction having a second distribution of the property of the particles or items, the first distribution being different from the second distribution. The conveyor screen comprises a row of shafts mutually spaced in a conveying direction, each of the shafts being rotatable about an axial center line thereof, extending transversely to the conveying direction, and carrying a row of radially projecting discs for intermittently urging material on the sorting conveyor upward and in the conveying direction, the discs of each of the rows being mutually spaced in longitudinal direction of the respective shaft. The discs of at least one of the rows are releasably clamped to the respective one of the shafts extending through openings in the discs, for allowing readjustment of the mutual spacing of the discs in longitudinal direction along the shaft when in released condition. The at least one shaft to which the discs of the at least one row are clamped has at least one recess in its outside surface. The releasably clamped discs each have at least one anchoring member for anchoring in the at least one recess and at least one tensioner for tensioning the disc body and the anchoring member radially towards each other.

Because the releasably clamped discs each have at least one anchoring member for anchoring in a recess in the shaft and at least one tensioner for tensioning the disc body and the anchoring member radially towards each other, the discs can be reliably fixed in axial direction without clamping via the disc body so that the clamping force required for keeping the disc axially positioned on the shaft does not have to be transferred through a large portion of the disc body. This allows the disc body to be of a relatively light design and of a soft material.

Particular elaborations and embodiments of the invention are set forth in the dependent claims.

Further features, effects and details of the invention appear from the detailed description and the drawings.

DETAILED DESCRIPTION

Figure 1:
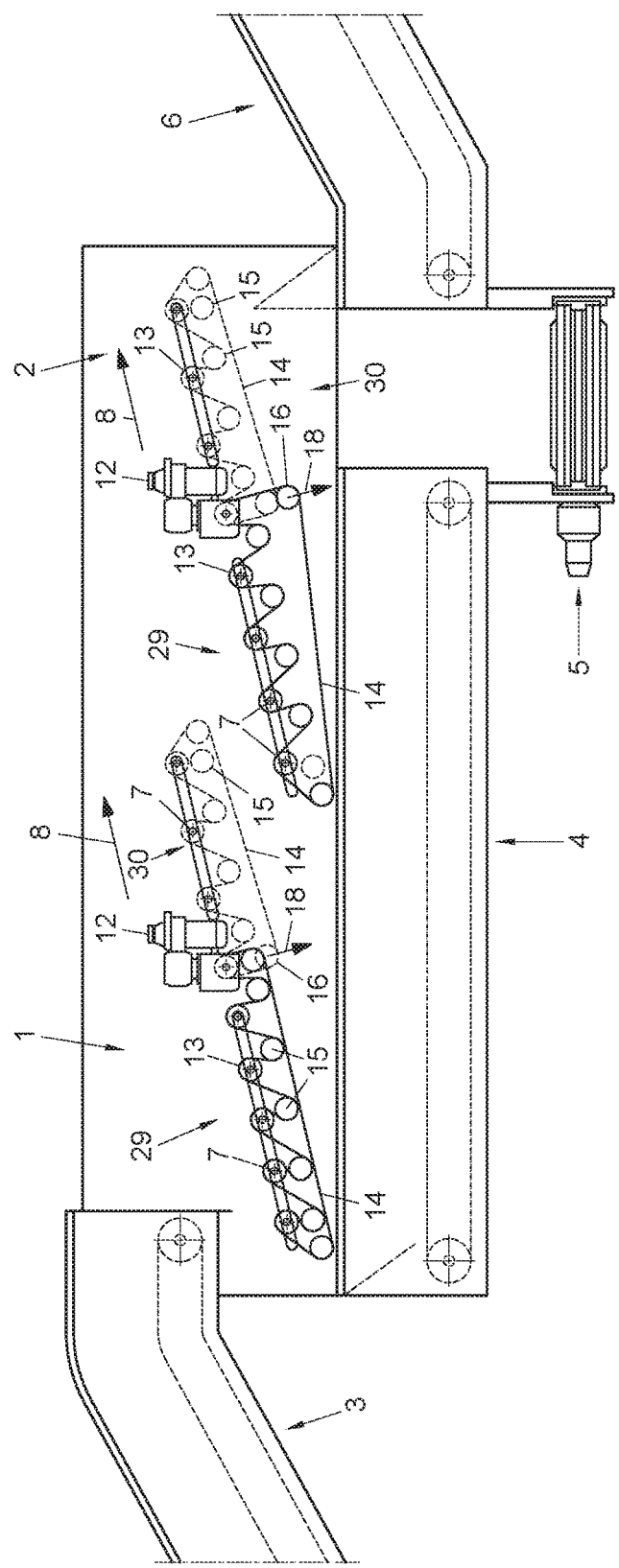
FIG. 1 is a schematic side view of an example of a separating conveyor system according to the present invention.

In FIG. 1, an example of a separating conveyor system is shown of which a separating portion is composed of two separating conveyor screens 1, 2 according to the invention. The conveyor screens 1, 2 are arranged in series. Depending on separating requirements and properties of the materials to be separated, a single separating screen or three or more separating screens arranged in series may also be provided. The upstream one 1 of the conveyors screens has a downstream end positioned above the upstream end of the downstream one 2 of the conveyor screens, so that material which has been passed over the upstream conveyor 1 is dropped onto the downstream conveyor 2. The system further includes a feeding conveyor 3 and discharge conveyors 4, 5 and 6.

Figure 2:
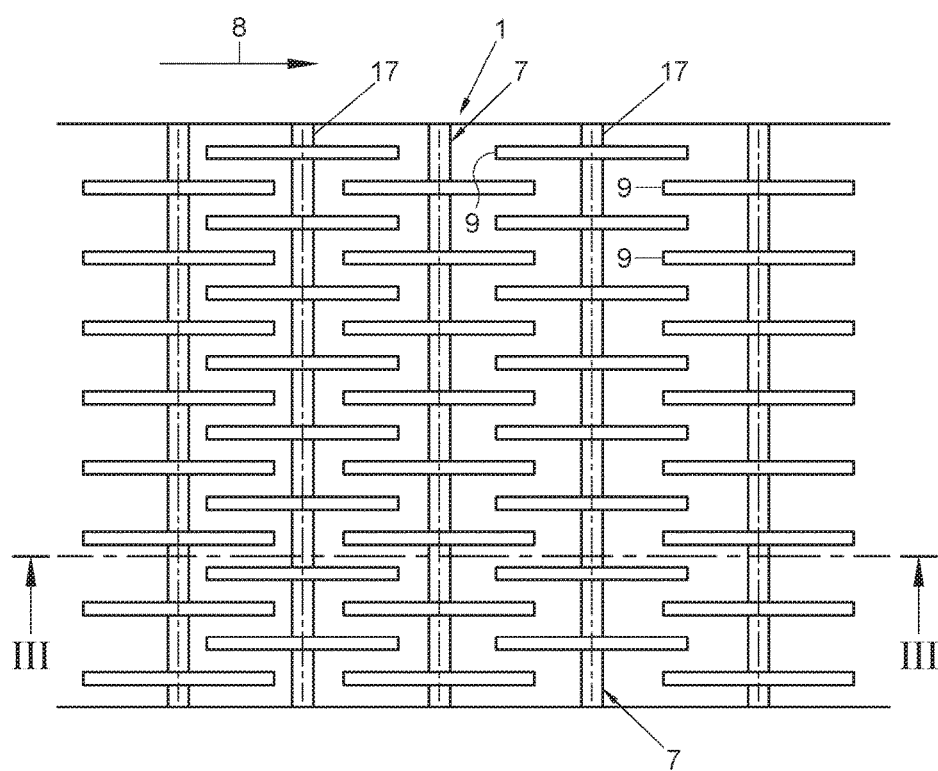
FIG. 2 is a schematic top plan view of a series of shaft assemblies of a conveyor screen of the separating conveyor system according to FIG. 1.
Figure 3:
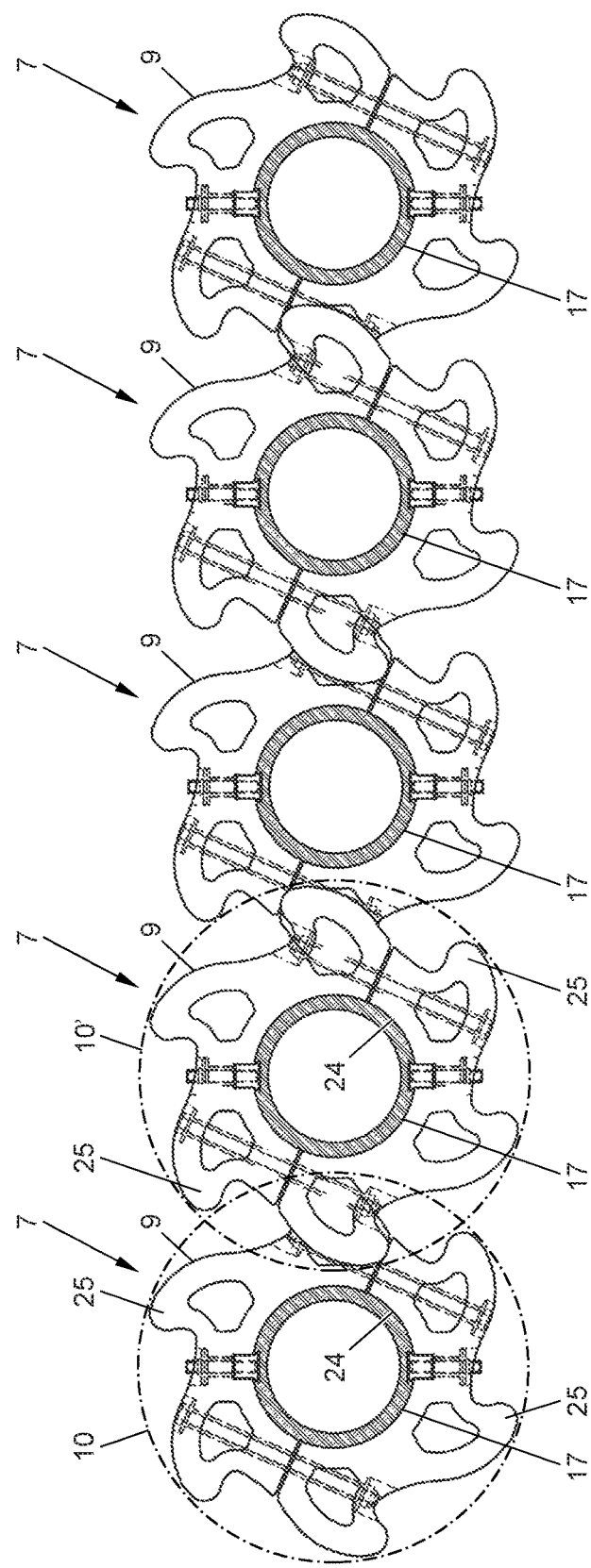
FIG. 3 is a side view in cross-section along the line III-III in FIG. 2.
Figure 4:
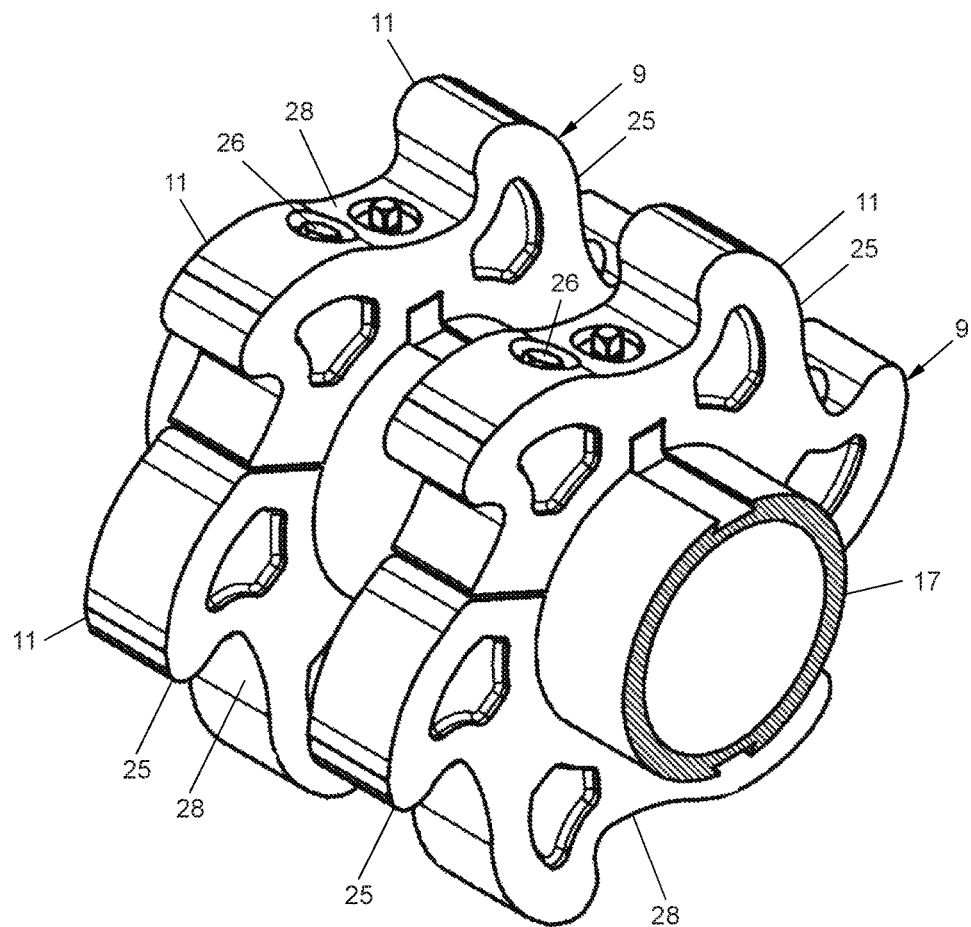
FIG. 4 is a perspective view of a cut-off portion of a shaft assembly of a separating conveyor according to FIGS. 1-3.
Figure 5:
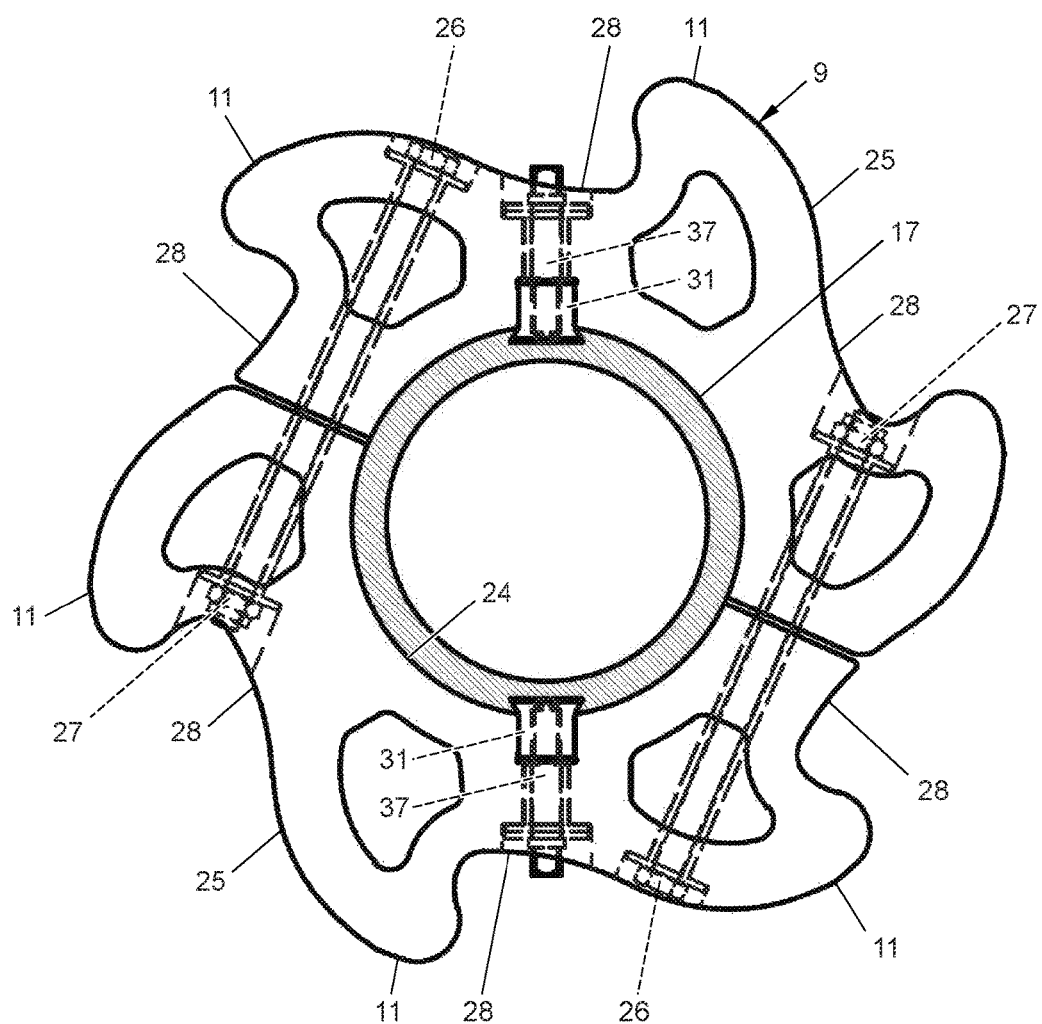
FIG. 5 is a view of the shaft assembly portion shown in FIG. 4.
Figure 6:
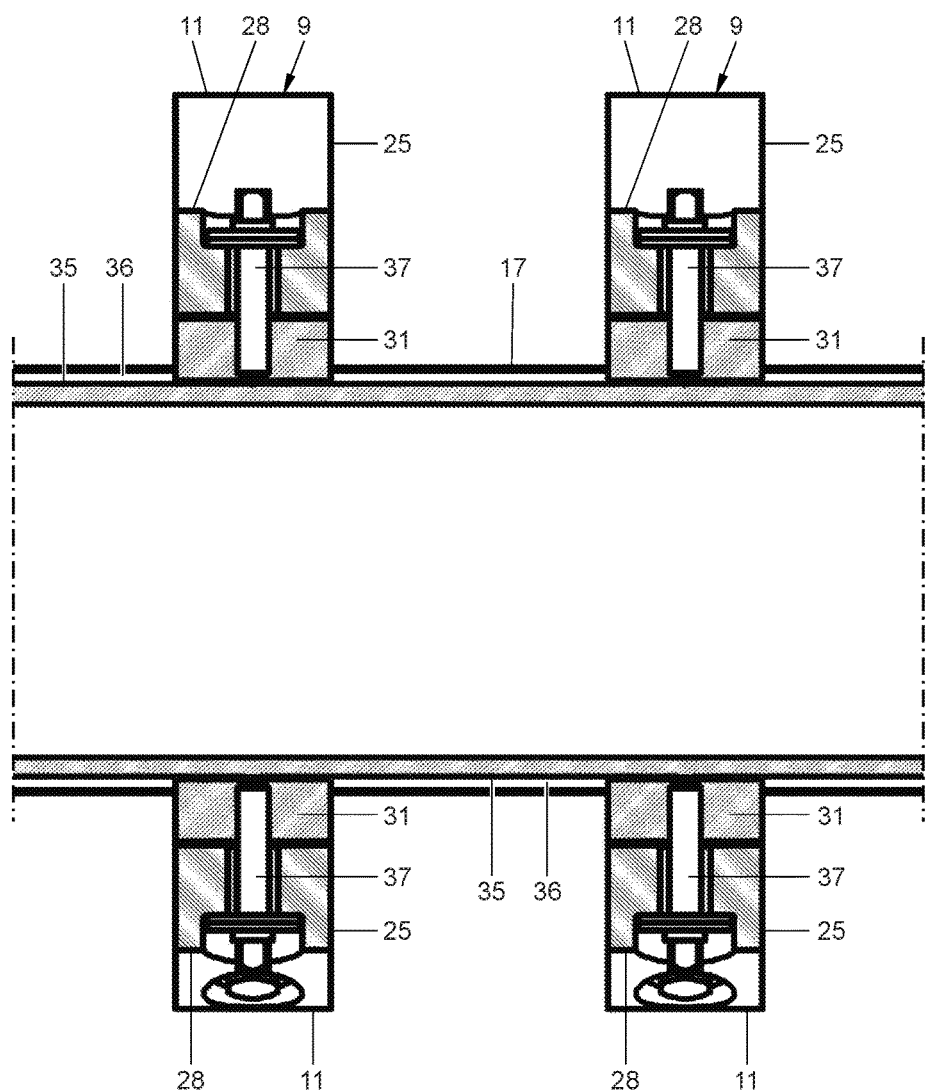
FIG. 6 is a longitudinal cross-sectional view of the shaft assembly portion according to FIGS. 3 and 4.
Figure 7:
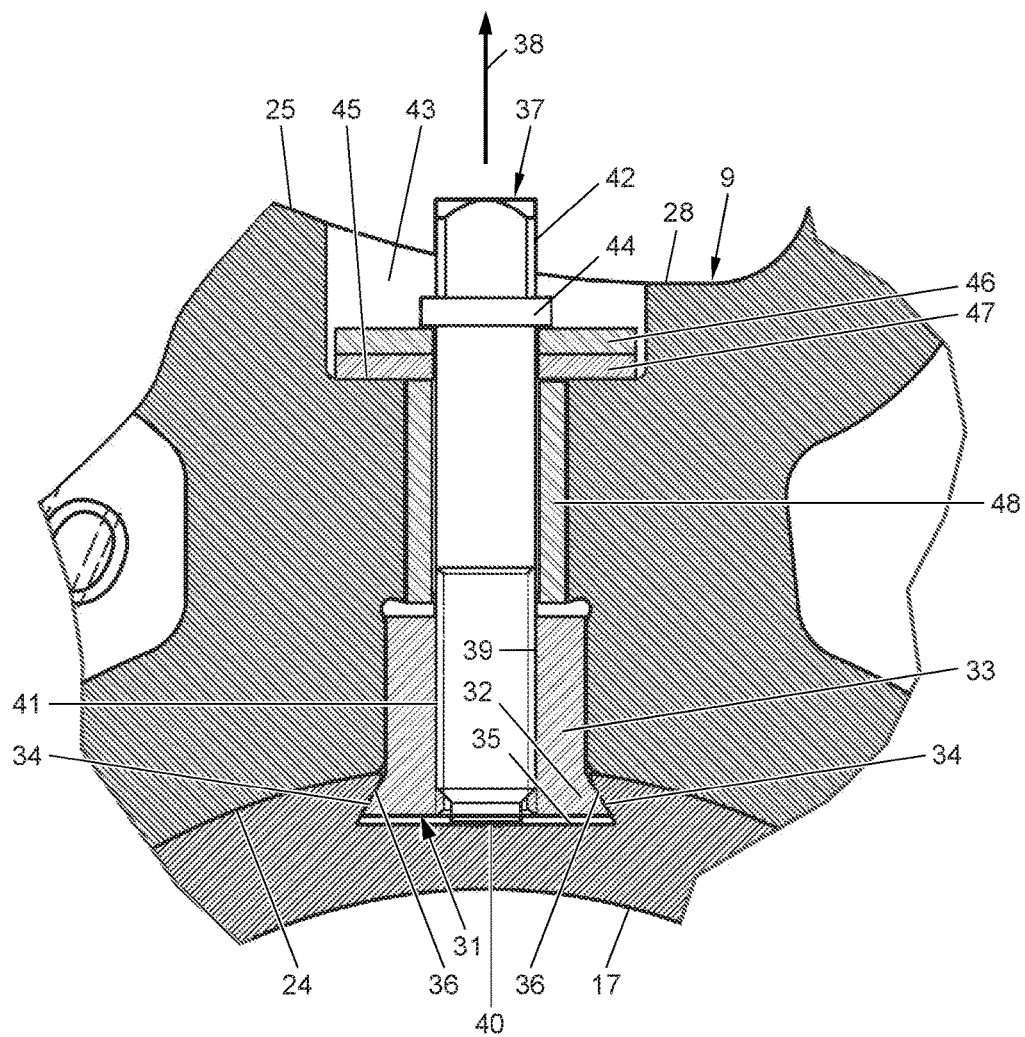
FIG. 7 is a view in cross-section along a plane through a disc of the shaft assembly portion shown in FIGS. 4-6.

The conveyor screens 1, 2 are each provided with a row of rotatable, driven shaft assemblies 7 (see also FIGS. 2 and 3, in FIG. 2 not all shaft assemblies are designated by reference numerals). The shaft assemblies 7 are arranged in positions with center lines of the shaft assemblies 7 mutually spaced in a conveying direction (arrow 8) and each extend perpendicularly to the conveying direction. The shaft assemblies 7 each have a shaft 17 carrying a row of radially extending discs 9 (in FIG. 2, not all discs are designated by reference numerals) for intermittently urging material on the conveyor screen upwards and in the conveying direction 8. The discs 9 of each of the shaft assemblies 7 are mutually spaced in the longitudinal direction of the respective shaft 17. In this example, rotary contours 10 of discs 9 (as defined by the disc portions at the largest radial distance from the shaft center line) carried by each of the shafts 17 project between rotary contours 10' of the discs 9 carried by a neighboring one of the shafts 17. Depending on the basis for separation and the nature of the materials to be separated, other disc configurations may be provided, such as discs of successive shafts mutually in line in transport direction or discs of successive shafts mutually staggered, but with rotary contours not projecting between rotary contours of discs of neighboring shafts.

In this example, the conveyors 1, 2 are further each provided with a motor-transmission unit 12 (FIG. 1) and transmission systems for driving the shaft assemblies 7. The transmission systems each include sprocket wheels 13 (not all sprocket wheels 13 are designated by reference numerals) rotationally fixed relative to the shaft assemblies 7, for transmitting driving forces exerted by the respective motor 12. The sprocket wheels 13 are engaged by a chain 14 which passes over the sprocket wheels 13, over divert wheels 15 (not all divert wheels 15 are designated by reference numerals) and over tensioning wheels 16. The tensioning wheels 16 are rotatably suspended from a tensioning structure which is adapted for resiliently exerting a tensioning force in a direction indicated by arrows 18.

In operation, material to be separated is fed along the feeding conveyor 3. From there, the material is deposited onto the upstream separating conveyor 1. The upstream separating conveyor 1 transports the material in conveying direction 8 through rotation of the discs 9 in conveying direction 8. Since the discs include radially projecting portions 11, the material on the conveyor 1 is simultaneously intermittently urged upwards and thereby agitated, which increases the likelihood that items sufficiently small and/or flexible to pass through open spaces in the conveyor 1 will eventually drop through the conveyor 1. Material that has not dropped through the conveyor 1 and has reached the downstream end of the conveyor 1 is dropped onto the downstream separating conveyor 2, where the same separating treatment is repeated, optionally at a different separation setting, so that a further, fraction of the material with different properties than the fraction that is first separated is separated.

Material that has dropped through the conveyors 1, 2 is carried off along discharge conveyors 4, 5. Material that has also passed the downstream conveyor 2 without dropping through is dropped onto a third discharge conveyor 6 and carried off to another location. The mutual spacing of the discs 9 of each shaft assembly 7 in the longitudinal direction of that shaft assembly 7 is adjustable.

In this example, each of the separating conveyors 1, 2 is constituted by an upstream section 29 and a downstream section 30. The mutual spacings between the shafts 17 in the upstream sections 29 and between the shafts 17 in the downstream sections 30 are independently adjustable. The upstream and downstream sections 29, 30 of each of the separating conveyors 1, 2 are driven by separate chains 14, so the circumferential velocities of the shaft assemblies 7 in the upstream and downstream sections are controllable independently of each other.

In FIG. 1, the upstream sections of both conveyors 1, 2 are shown in a setting in which the chain 14 skips a divert wheel 15 as well. The spare divert wheels 15 allow mounting an additional shaft. As is best seen in FIGS. 4-7, the discs 9 are each provided with an opening 24 through which a shaft 17 carrying that disc 9 extends. A releasable part 25 is displaceable when in released condition. When the releasable part 25 is in displaced condition, a radial passage for passing the shaft 17 radially into and out of the opening 24 is obtained. This construction of the discs allows the discs 9 to be mounted on and dismounted from the shafts 17 without dismounting the shafts 17. Thus, if damage to a disc 9 or readjustment of the lateral spacing between the discs 9 necessitates mounting or dismounting discs 9, discs 9 can be dismounted from the shaft assembly 7 or mounted onto the shaft 17 without dismounting the shaft 17. In particular, given the fixed width of the separating conveyors 1, 2, substantial adjustment of the mutual, lateral spacing between the discs 9 of a shaft assembly 7 will generally require the removal or addition of at least one disc plate assembly 9.

The discs 9 of the separating conveyors shown can be manufactured particularly efficiently, because the disc body is formed by two mutually identical parts 25. The parts 25 are releasably clamped around the one of the shafts 17 carrying that disc 9 by bolts 26 engaging nuts 27 in the opposite parts. The disc body can also be advantageously formed by more than two identical parts clamped around the shaft.

The discs 9 have radial projections 11 projecting further outward than radially recessed portions 28 between the projections 11. However, depending on the requirements and properties of the materials to be separated, other shapes may be more advantageous.

The discs 9 each have anchoring members 31 fixed in a recess 35 in the shaft 17. The anchoring members 31 each have an anchoring portion 32 projecting into the opening 24 in a radially inward direction and a positioning portion 33 fitted in the disc body part 25. The anchoring portion 32 has projections 34 in circumferential sense of the opening 24 for anchoring in undercuts 36 in side walls of the recess 35 in an outside surface of the shaft 17. The undercuts are portions of the side wall that are recessed relative to radially more outwardly located portions of the side wall, so that a projection projecting into the undercut cannot be moved radially out of the recess. In the present example, the recesses are slots 35 each extending in longitudinal direction of the shaft 17, so that the positions of the anchoring members 31 in longitudinal direction of the slots 35 can be chosen freely. Furthermore, the slots 35 may extend over such lengths that many discs 9 (preferably all discs 9 mounted to a shaft 17) can be anchored in the same slot or, as in the present example, in the same set of circumferentially distributed slots 35.

The slots 35 have a dovetail shaped cross-section, so the undercuts are formed by the entire sidewalls since the entire sidewalls are recessed relative to upper (i.e. outer) edges thereof. Furthermore, the discs 9 each have tensioners 37 for tensioning the associated anchoring member 31 in a radially outward direction (arrow 38 in FIG. 7).

The anchoring members 31 fixed in the recess 35 in the shaft 17 and each tensioned by a tensioner 37 tensioning the anchoring member 31 in a radially towards the disc body, reliably fix the disc 9 in axial direction without clamping via the disc body, so that the clamping force required for keeping the disc 9 axially positioned on the shaft 17 does not have to be transferred through a large portion of the disc body. This allows the disc body to be of a relatively light design and of a soft material that exhibits tension relaxation under continuous static loads.

Because the anchoring member 31 has an anchoring portion 32 projecting into the opening 24 in a radially inward direction and a positioning portion 33 fitted in the disc body and the anchoring portion 32 has projections 34 in circumferential sense of the opening 24 for anchoring in the undercuts 36 in a side walls of the slot 35 in an outside surface of the shaft 17, the anchoring member 31 can easily be fixed and be fixed in any position in a range along the length of the slot 35. Anchoring may also be achieved by a single projection on one side of the anchoring member engaging an undercut on the same side.

A passage 39 extends radially through the anchoring member 31 and the tensioning member 37 extends through the passage 39 and is arranged for exerting a tensioning force via a free end 40 projecting radially inwardly of the anchoring member 31. Thus, tension forces are transferred very directly and a very simple construction is sufficient for exerting the tension force.

The construction can be particularly simple if, as in the present example, the passage is a threaded bore 39 and the tensioning member is a bolt 37 having a threaded stem 41 in threaded engagement with the threaded bore 39. By turning the bolt 37 using a tool engaging a head 42 of the bolt 37, the bolt 37 can be screwed through the anchoring member 31, until its distal end 40 projects from the anchoring member 31 far enough to abut against the bottom of the slot 35. By tightening the bolt 37 to a prescribed tightening torque, the anchoring member 31 is urged out of the slot and its projections 34 are clamped against the undercuts of the sidewalls 36 of the slot 35, so that the anchoring member is reliably fixed against movement in axial direction of the shaft 17.

The head 42 of the bolt 37 is partially located in a recess 43 in an outer circumferential surface 28 of the disc body, so that it does not interfere significantly with the sorting function of the disc. Also, the head 42 of the bolt 32 is located between radially projecting portions 11 of the disc, so that it is further shielded from the materials to be sorted.

The tensioning member 37 and the disc body are furthermore arranged for pressing the disc body radially inwardly towards the anchoring member 31 when the tensioning member 37 is tensioned. Thus, the disc body is firmly pressed against the outer surface portions of the shaft 17 adjacent to the anchoring member 31, so that play between the shaft 17 and the disc body is eliminated and the disc body is firmly held in place at the anchoring members 31. In the present example, this is achieved in a simple manner by providing that the tensioning member 37 has a flange 44 pressing against an outwardly facing shoulder 45 of the disc body via washers 46, 47. Between a radially outwardly facing side of the anchoring member 31 and opposite surfaces of the disc body part 25 and of a bushing 48 lining a portion of the passage 39, some free space is left, so that it is ensured that the tensioning bolt 37 can be tightened far enough for tensioning the anchoring member 31 and that the portion of the disc body part 25 between the washers 46, 47 and the anchoring member 31 can accommodate to the radially inward displacement of the washers 46, 47 as the tensioning bolt 37 is tightened.

Instead of as a bolt 37 extending through a bushing 48, the tensioning member may also be provided in another form, such as in the form of a fitted bolt accurately fitting in a passage through the polymer material of the disc body.

Because the anchoring portion 32 is dovetail-shaped, it is also positioned accurately in circumferential sense when it is tensioned in radially outward direction. Moreover, a wedging effect is achieved, so that effective clamping is achieved already at relatively moderate tensioning forces.

Preferably, the anchoring member 31 and the tensioning member 37 are of metal material and the disc body is of polymer material. Thus, the tensioning and clamping forces are transferred through material in which tension relaxation over time does not occur and the disc body is of a relatively soft but wear resistant, light and low-cost material. The anchoring member 31 and the tensioning member 37 may for instance be of steel and the disc body parts 25 may for instance be of Polyethylene, Polypropylene or Polyurethane or rubber material. In particular if a thermoplastic material is used, the disc body parts may entirely or partially be of recycled material.

The anchoring member 31 has a size in axial direction of the opening 24 which is equal to the size of an adjacent portion of the disc body parts 25 in that axial direction. Thus, the clamping forces are distributed over a large surface area and the disc body is effectively supported against tilting in axial direction. On the other hand, the anchoring member 31 does not project axially from the disc body, so that it does not interfere with the separating function.

If, as in the present example, the disc 9 has two anchoring members 31, distributed in circumferential sense around the opening 24, the disc 9 is held in position particularly reliably. For this effect, the anchoring members 31 are preferably distributed evenly in circumferential sense and also a larger number of anchoring members may be provided. However, depending on the requirements, a single anchoring member per disc may also be advantageous, since it reduces costs and allows particularly quick mounting and dismounting as well as readjustment of the position of a disc.

In the present example, the releasable part 25 is one of two mutually identical disc body parts 25 clamped to each other, each of said disc body parts 25 being provided with an anchoring member. This combines a small variety in parts with anchoring positions that are evenly distributed in circumferential sense.

While in the present example, the discs have a maximum thickness in axial direction which is constant from the shaft to the radially most outward portions of the disc, it is also possible to provide that the discs have a thickness in axial direction that varies between the shaft and the radially most outward portions of the disc, e.g. a thickness that decreases from the shaft towards the radially most outward portions to provide rhombus shaped passages. Also, seen in cross-section along a plane through the center line of the discs, the sides of the discs may be curved or stepped, for instance to provide passages with rounded boundaries.

Further, in the above example, the anchoring members engage undercuts is side walls of the slots. It may however also be provided that the anchoring members are fixed in another manner. The anchoring members may for instance be anchored in the recesses of the circumferential surface of the shaft and include fasteners, such as bolts, threaded into threaded holes in the shafts. For allowing adjustment of positions of discs in axial direction of the shafts, the anchoring members may for instance be provided with one or more rows of threaded holes. Threaded ends of the tensioning members may be screwed into selected ones of the threaded holes to determine the axial positions of the discs. In the event of wear or damage to the threaded holes, or if a different pattern of holes is required, the anchoring members can be replaced easily.

Several features have been described as part of the same or separate embodiments. However, it will be appreciated that the scope of the invention also includes embodiments having combinations of all or some of these features other than the specific combinations of features embodied in the examples.

The invention claimed is:

1. A disc for a separating conveyor screen, the disc having:
   a disc body with a releasable part and with an opening in an axial direction for receiving a shaft carrying the disc, the releasable part being displaceable when in released condition between a displaced position leaving open a radial passage for passing the shaft radially into and out of the opening and a mounted position for enclosing the shaft in the opening;
   at least one anchoring member arranged for fixation in a recess in an outside surface of the shaft; and
   at least one tensioner for tensioning said anchoring member in a radially outward direction towards said disc body.

2. A disc according to claim 1, wherein said anchoring member has an anchoring portion projecting into said opening in a radially inward direction and a positioning portion fitted in said disc body,
   said anchoring portion having at least one projection in circumferential sense of said opening for anchoring in at least one undercut in a side wall of at least one slot forming the recess.

3. A disc according to claim 1, wherein a passage extends radially through the anchoring member and wherein the tensioning member extends through said passage and is arranged for exerting a tensioning force via a free end projecting radially inwardly of said anchoring member.

4. A disc according to claim 3, wherein said passage is a threaded bore and wherein the tensioning member is a bolt having a threaded stem in threaded engagement with the threaded bore.

5. A disc according to claim 4, wherein the bolt has a head, at least partially located in a recess in an outer circumferential surface of the disc body.

6. A disc according to claim 3, wherein the tensioning member and the disc body are arranged for pressing the disc body radially inwardly towards the anchoring member when the tensioning member is tensioned.

7. A disc according to claim 4, wherein the tensioning member and the disc body are arranged for pressing the disc body radially inwardly towards the anchoring member when the tensioning member is tensioned and wherein the tensioning member has a flange for pressing against an outwardly facing shoulder of the disc body.

8. A disc according to claim 1, wherein the anchoring portion is dovetail shaped.

9. A disc according to claim 1, wherein the anchoring member and the tensioning member are of metal material and the disc body is of polymer material.

10. A disc according to claim 1, wherein the anchoring member has a size in axial direction of the opening which is equal to the size of an adjacent portion of the disc body in said axial direction.

11. A disc according to claim 1, comprising at least two of said anchoring members, distributed in circumferential sense around said opening.

12. A disc for a separating conveyor screen, the disc having:
   a disc body with a releasable part and with an opening in an axial direction for receiving a shaft carrying the disc, the releasable part being displaceable when in released condition between a displaced position leaving open a radial passage for passing the shaft radially into and out of the opening and a mounted position for enclosing the shaft in the opening;
   at least one anchoring member arranged for fixation in a recess in an outside surface of the shaft; and
   at least one tensioner for tensioning said disc body and said anchoring member radially towards each other;
   wherein the releasable part is one of at least two mutually identical disc body parts clamped to each other, each of said disc body parts being provided with an anchoring member.

13. A separating conveyor screen for sorting a material composed of large numbers of loose items or particles, into a first fraction having a first distribution of a property of the particles or items and a second fraction having a second distribution of said property of the particles or items, said first distribution being different from said second distribution,
   the conveyor screen comprising a row of shafts mutually spaced in a conveying direction, each of said shafts being rotatable about an axial center line thereof, extending transversely to said conveying direction, and carrying a row of radially projecting discs for intermittently urging material on the sorting conveyor upward and in the conveying direction, the discs of each of said rows being mutually spaced in longitudinal direction of the respective shaft,
   wherein the discs of at least one of said rows are releasably clamped to the respective one of said shafts extending through openings in said discs, for allowing readjustment of the mutual spacing of said discs in longitudinal direction along said shaft when in released condition, wherein the at least one shaft to which the discs of said at least one row are clamped has at least one recess in its outside surface; and wherein said releasably clamped discs each have at least one anchoring member for anchoring in said at least one recess and at least one tensioner for tensioning said anchoring member in a radially outward direction radially towards said disc body.

14. A conveyor according to claim 13, wherein the at least one recess is a slot extending in longitudinal direction of said shaft, wherein side walls of said slot have at least one undercut, said anchoring member has an anchoring portion projecting into said opening in a radially inward direction and a positioning portion fitted in said disc body, said anchoring portion having at least one projection in circumferential sense of said opening anchoring in at least one undercut in a side wall of said slot.

* * * * *